Figures 1, 2:
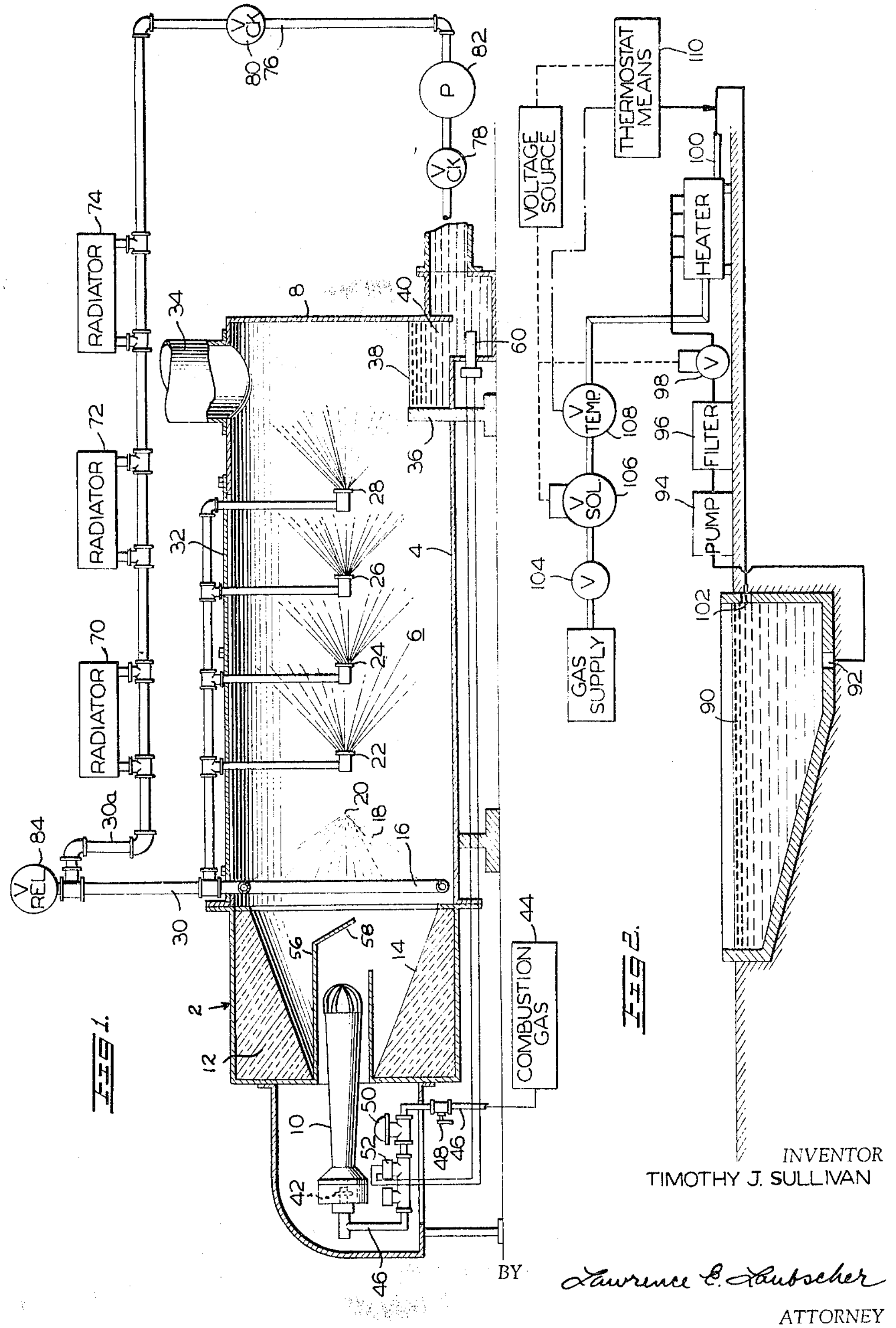

Dec. 13, 1966 T. J. SULLIVAN 3,291,119

DIRECT-FIRED WATER HEATING APPARATUS

Filed Sept. 21, 1964

INVENTOR
TIMOTHY J. SULLIVAN

BY Lawrence E. Laubscher

ATTORNEY

United States Patent Office 3,291,119
Patented Dec. 13, 1966

3,291,119

DIRECT-FIRED WATER HEATING APPARATUS

Timothy J. Sullivan, Butte, Mont., assignor to Sullivan Valve and Engineering Company, Butte, Mont., a corporation of Montana Filed Sept. 21, 1964, Ser. No. 397,878
4 Claims. (Cl. 126—350)

This invention relates generally to water heating apparatus, and more particularly to water heating apparatus including means for spraying water axially of a horizontal combustion chamber for direct heating by a gas flame under substantially atmospheric conditions.

In residential and commercial hot water heating installations, use is often made of gas-fired boiler apparatus including a combustion chamber in heat transfer relationship with respect to pipes or conduits through which the water to be heated flows under pressure. The common ten to fifty gallon residential hot water units generally require an appreciable recovery time for heating water to the desired temperature. Furthermore, the operating life of conventional units is relatively short, ranging anywhere from a period of months to a number of years. In large commercial units, the danger of explosion exists in view of the large boiler pressures developed in the system. Moreover, in certain locales the water to be heated contains a high percentage of impurities that tend to form restrictive deposits in the conduits which eventually impede fluid flow and result in corrosion.

Direct-fired water heating devices have been proposed in the prior art for generating steam for driving turbines, for jet propulsion motor systems, and the like. These known systems are of the high pressure type and normally require the use of compressor means or a source of compressed air to obtain the required operating pressure. The known devices are of relatively complex and expensive construction, and owing to their high operating pressures, are subject to dangerous boiler explosions and require complicated pressure controls.

The primary object of the present invention is to provide an improved direct-fired water heating apparatus that operates in the atmospheric pressure range. The invention is characterized in that the flame of a gas burner is directed axially of a combustion chamber toward an end wall thereof. Means are provided for introducing a spray of water in the combustion chamber colinearly with respect to the gas flame in the direction of the end wall. The spray means include a plurality of longitudinally spaced nozzles having convergent and/or divergent spray patterns. The combustion chamber is vented to atmosphere adjacent the end wall, and the heated water is removed from the combustion chamber through an outlet that communicates with the lower portion of the combustion chamber adjacent the end wall. In accordance with the invention, owing to the force of the sprayed fluid, the energy of the gas flame, and the draft resulting from the atmospheric venting means, the combustion gases and the entrained liquid particles are transported axially through the combustion chamber and impinge against the end wall, whereupon the combustion gases are ejected via the vent means and the heated liquid is withdrawn from the chamber outlet.

According to a more specific object of the invention, hot water heating apparatus is provided that includes a horizontally-arranged gas burner of the venturi type that directs a gas flame axially of the combustion chamber toward an end wall thereof. Nozzle means are successively arranged in the combustion chamber for generating divergent and/or convergent conical spray patterns colinearly with respect to, and in the same direction as, the gas flame. As a result of the invention, relatively large quantities of water may be heated in a relatively short period of time in a simple, inexpensive, efficient and safe manner. The direct-fired hot water heating apparatus is particularly suitable for residential installations including conventional hot water radiators or base board heaters, and in continuous-flow large-volume installations (such as in swimming pool heating systems, for example). The heater means of the present invention afford the additional advantage that the draft through the horizontal combustion chamber effected by the atmospheric venting means is sufficient to sustain efficient operation, and consequently the need for draft-producing fan means or compressor means is eliminated.

Other objects and advantages of the invention will become apparent from a study of the following specification when considered in conjunction with the accompanying drawing, in which:

FIGURE 1 is a longitudinal sectional view of the water heating means connected in a residential heating system, the elements of which are illustrated diagrammatically; and FIGURE 2 is a diagrammatic illustration of a heated swimming pool system incorporating the water heater of the present invention.

Referring first to FIGURE 1, the water heating apparatus 2 includes a housing 4 containing a cylindrical combustion chamber 6 one end of which is defined by the vertical housing wall 8. Mounted in one end of the housing 4 is a conventional, horizontally-arranged gas-fired venturi burner 10 the free end of which extends axially in the combustion chamber 6 in the direction of end wall 8. The housing, which contains openings at one end to supply air to the burner, also includes an annular refractory collar 12 that surrounds the free end of the venturi and extends axially therebeyond in the direction of end wall 8. The collar 12 is bored to define a conical wall surface 14 that diverges outwardly from the free extremity of the venturi.

Mounted in the combustion chamber 6 intermediate the venturi burner 10 and the end wall 8 is an annular spray nozzle 16 that consists of a perforated pipe or conduit concentrically arranged relative to the burner axis. The perforations of the nozzle means 16 are so arranged as to define a conical water spray pattern 18 that converges at an apex 20 colinear with the burner axis. Longitudinally spaced from the burner 10 intermediate annular nozzle 16 and end wall 8 are a plurality of additional spray nozzles 22, 24, 26, 28 that are colinearly arranged relative to the burner axis. Each of these additional spray nozzles sprays water in a divergent pattern in the direction of housing wall 8. Water is supplied to the nozzles 16, 22, 24, 26 and 28 via water supply conduit 30. The housing wall includes a removable section 32 that permits insertion and removal of the nozzles in the combustion chamber.

Adjacent the upper portion of end wall 8, the housing 4 includes vent means 34 for venting the combustion chamber 6 to atmosphere. Adjacent the lower portion of the end wall 8, the housing includes a trough 36 that receives liquid 38 which defines a liquid seal for housing outlet 40.

A combustible gas is supplied to the burner nozzle 42 from the gas supply 44 via a conduit 46 that contains a manually-operated shut-off valve 48, a temperature-responsive valve 50, and an electrically-operated solenoid valve 52. Extending into the outlet 40 is a thermostat 60 that controls the operation of solenoid valve 52. The valve 50 is operated in response to outlet temperature by conventional temperature responsive means (for example, expansible fluid means), not shown.

In order to prevent the flame from blowing off the end of the venturi and to assist in effecting complete combustion of the gases, in some instances it may be desirable to provide a sleeve 56 carrying a stainless-steel target 58 against which the burner flame is directed. The apparatus however, will operate satisfactorily when this target is omitted.

In a typical residential heating installation including a plurality of radiators 70, 72 and 74, the outlet 40 of the housing 4 is connected with the inlets of the load by conduit 76 containing a pair of check valves 78 and 80 between which is connected a pump 82. The outlets of the load are connected with water supply conduit 30 via a loop portion 30*a* that extends to a higher elevation than any of the radiators and includes a vacuum relief valve 84.

In operation, assume that the gas valves 48, 50 and 52 are open, that the burner is ignited, and that the pump 82 is in operation. The water sprayed in the direction of wall 8 by nozzles 16, 22, 24, 26 and 28 is directly heated by the flame that extends axially from the free end of the venturi 10. Owing to the convection flow of the combustion gases from chamber 6 to atmosphere via vent 34, the inspiration effect of the water spray and the force of the burner flame, the heated water particles are transported to the right and impinge upon the housing wall 8, whereupon the heated particles fall by gravity and are collected in the water seal defined by trough 36. Water is pumped by pump 82 from outlet 40 through conduit 76 and check valves 78 and 80, and is supplied to the radiators 70, 72 and 74 to heat the desired room spaces. Water from the horizontal hot water main and the radiators is returned to supply line 30 via the elevated loop portion 30*a*.

In the event that the outlet fluid temperature exceeds a predetermined value, the thermostat 60 effects a throttling operation of solenoid valve 52 to reduce the supply of combustion gas to the burner, whereupon the temperature of the heated water is progressively returned to the desired value. In the event that the operation of the pump 82 is interrupted, check valves 78 and 80 close and vacuum relief valve 84 opens, whereby draining of the radiators into the combustion chamber 6 is avoided.

It is important to note that the heating system of the present invention operates at substantially atmospheric pressure. Since the combustion chamber is vented to atmosphere, the use of fan means for effecting a forced draft is not required. This results from the fact that the water spray itself creates a draft in the direction of flow of the combustion gases (i.e., in the direction of end wall 8). Moreover, the colder water condenses the flame causing a partial vacuum which in turn causes an inflow of air over the burner. Since the heating system is a low pressure atmospheric system, the possibility of boiler explosions and similar dangers is positively eliminated.

The hot water heating system is particularly suitable for use in installations where a large quantity of water is to be heated in a relatively short period of time. Referring to FIGURE 2, when the burner apparatus is utilized for heating the water of a swimming pool 90, the water is pumped from the pool outlet 92 to the spray nozzles of the heater via pump 94, water filter and purifier 96, and electrically-operable solenoid valve 98. Heated water is taken from the heater outlet 100 and is returned to the pool via inlet 102. The combustion gas is supplied to the heater via valve 104, solenoid valve 106 and temperature responsive valve 108. Valves 98 and 106 are electrically controlled by the thermostat means 110 in accordance with the water temperature at the heater outlet. The conventional temperature responsive valve 108 is mechanically controlled in accordance with output temperature. Thus the system of FIGURE 2 constitutes a high-flow-rate low-pressure atmospheric system for heating large quantities of water in a relatively short period of time.

While in accordance with the provisions of the patent statutes the best form and embodiments of the invention have been illustrated and described, it will be apparent to those skilled in the art that various changes and modifications may be made in the apparatus described without deviating from the invention set forth in the following claims.

What is claimed is:

1. Water heating apparatus, comprising a housing containing a combustion chamber having a horizontal axis, said housing including a vertical end wall defining one end of said combustion chamber, the upper and lower portions of said housing containing immediately adjacent said end wall combustion gas vent and hot water discharge openings, respectively;

fuel burner means connected with said housing directly opposite said end wall for directing a horizontal flame axially of said combustion chamber in the direction of said end wall; and water spray means between said burner means and said end wall for spraying water axially of said combustion chamber solely in the direction of said end wall, said spray means including parallel with and spaced from said end wall an annular nozzle coaxially arranged relative to, and having a greater diameter than, the flame produced by said burner means, said annular nozzle providing a convergent conical spray pattern directed toward said end wall and having an apex colinear with the axis of the burner flame.

2. Water heating apparatus, comprising a housing containing a combustion chamber having a horizontal axis, said housing including a vertical end wall defining one end of said combustion chamber, the upper and lower portions of said housing containing immediately adjacent said end wall combustion gas vent and hot water discharge openings, respectively;

fuel burner means connected with said housing directly opposite said end wall for directing a horizontal flame axially of said combustion chamber in the direction of said end wall; and water spray means between said burner means and said end wall for spraying water axially of said combustion chamber solely in the direction of said end wall, said spray means including parallel with and spaced from said end wall an annular nozzle coaxially arranged relative to, and having a greater diameter than, the flame produced by said burner means, said annular nozzle providing a convergent conical spray pattern directed toward said end wall and having an apex colinear with the axis of the burner flame, said spray means including also at least one additional spray nozzle arranged colinearly with the axis of the burner flame between said end wall, and said annular nozzle, said additional spray nozzle producing a divergent conical spray pattern in the direction of said end wall.

3. Apparatus as defined in claim 2 wherein said housing includes wall means cooperating with the lower portion of said end wall to define a trough beneath said vent opening and in communication with said discharge opening, whereby heated water particles that impinge against said end wall fall by gravity into said trough.

4. Apparatus as defined in claim 3, wherein said housing further includes an annular refractory collar surrounding, and extending axially in the direction of said end wall beyond said burner means, said collar containing a conical bore that diverges outwardly in the direction of said end wall.

References Cited by the Examiner

UNITED STATES PATENTS

| | | | |
|---|---|---|---|
| 1,527,740 | 2/1925 | Lipshitz | 126—359 |
| 2,162,571 | 6/1939 | Bock | 236—20 X |
| 2,893,359 | 7/1959 | Magovern | 126—355 X |
| 2,959,216 | 11/1960 | Alger | 158—113 |
| 2,992,676 | 7/1961 | Henwood | 158—113 |
| 3,204,629 | 9/1965 | Newton | 126—355 |

EDWARD J. MICHAEL, *Primary Examiner.*